(12) United States Patent
Rohm et al.

(10) Patent No.: US 6,289,400 B1
(45) Date of Patent: Sep. 11, 2001

(54) ELECTRICAL CONTROL DEVICE WITH CONFIGURABLE CONTROL MODULES

(75) Inventors: Peter Rohm, Pfaffenhofen; Patrick Leteinturier, München, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/060,787

(22) Filed: Apr. 15, 1998

(51) Int. Cl.$^7$ .................................................. G06F 13/00
(52) U.S. Cl. ................................................. 710/8; 713/400
(58) Field of Search ........................ 710/8–14, 62–63, 710/72; 713/100, 400–401, 800–803, 600–601, 176–177; 702/186; 708/311; 326/40; 381/71

(56) References Cited

U.S. PATENT DOCUMENTS

| | | | | |
|---|---|---|---|---|
| 4,004,236 | * | 1/1977 | Cardon et al. ........................ | 708/311 |
| 5,563,526 | * | 10/1996 | Hastings et al. ....................... | 326/37 |
| 5,574,930 | * | 11/1996 | Halverson, Jr. et al. ............... | 712/34 |
| 5,619,581 | * | 4/1997 | Ferguson et al. .................. | 381/71.12 |
| 5,694,336 | * | 12/1997 | Hirao .................................... | 702/186 |
| 5,724,276 | * | 3/1998 | Rose et al. ........................... | 708/235 |
| 5,726,586 | * | 3/1998 | Chan et al. ............................ | 326/40 |
| 5,793,680 | * | 8/1998 | Okajima .......................... | 365/189.05 |
| 5,925,135 | * | 7/1999 | Trieu et al. ........................... | 713/400 |
| 5,943,490 | * | 8/1999 | Sample ........................... | 395/500.49 |
| 6,058,487 | * | 5/2000 | Isoda ................................... | 713/502 |
| 6,064,236 | * | 5/2000 | Kuwata et al. ........................ | 327/12 |

\* cited by examiner

Primary Examiner—Christopher B. Shin
(74) Attorney, Agent, or Firm—Herbert L. Lerner; Laurence A. Greenberg; Werner H. Stemer

(57) ABSTRACT

A multifunctional electrical control device for producing control signals for driving electrical devices. The control device produces the control signals with a large number of control modules which can be configured with respect to their interaction. This means that the control device is of simple construction, can be used in a variety of ways and can be in each case optimally adapted to the prevailing conditions with a minimum of effort.

16 Claims, 2 Drawing Sheets

ELECTRICAL CONTROL DEVICE WITH CONFIGURABLE CONTROL MODULES

BACKGROUND OF THE INVENTION

Field of the Invention

The present invention relates to an electrical control device for producing control signals for driving electrical devices.

Electrical control devices of this generic type are known in innumerable embodiments and are used for a wide variety of purposes.

The construction of the electrical control device depends very much on such variables as what device is to be controlled and in dependence of which events or parameters. The result of this is that the options for using a respective electrical control device are relatively limited, which is without doubt a disadvantage of the prior art control devices.

SUMMARY OF THE INVENTION

It is accordingly an object of the invention to provide an electrical control device, which overcomes the above-mentioned disadvantages of the prior art devices and methods of this general type and which is of simple construction and suitable for use in a variety of ways.

With the foregoing and other objects in view there is provided, in accordance with the invention, an electrical control device for producing control signals for driving electrical devices, comprising: a plurality of control modules configurable with respect to an interaction thereof, the control modules producing control signals for driving electrical devices.

In other words, the invention is characterized by a large number of control modules which produce the control signals and whose interaction can be configured.

Due to the fact that the interaction of the control modules can be set individually, it is possible to configure the control device for a wide variety of control tasks, that is to say to use it for extremely diverse purposes. The amount of effort required for this is no greater than in the case of conventional control devices of comparable performance.

In accordance with an added feature of the invention, the control modules are adapted to react in a predetermined manner to specific events and to output data or signals representing the reaction to respective other control modules and/or as output signals of the control device.

In accordance with an additional feature of the invention, there is provided a setting device connected to the control modules, the setting device selectively setting an interaction between respective control modules.

In accordance with a further feature of the invention, the setting device selectively sets which of the control modules are connected to which input terminals and output terminals of the control device.

In accordance with another feature of the invention, the setting device is adapted to implement the settings individually while the control device is in operation.

In accordance with again a further feature of the invention, the control modules are connected in series to form a control module sequence.

In accordance with again another feature of the invention, the control modules feed data or signals to a respective control module which is connected adjacent (upstream or downstream in terms of signal flow) in the control module sequence.

In accordance with again an additional feature of the invention, the control modules are adapted to pass on data or signals received from one of the control module to another control module.

In accordance with again an added feature of the invention, the control modules are each substantially identical.

In accordance with again another feature of the invention, the control modules are multifunctional modules which can operate independently of one another in one of a plurality of operating modes as selected.

In accordance with a concomitant feature of the invention, the control modules are adapted to be used as one or more of the following: a counter, a comparator, an edge detector, and a capture unit.

Other features which are considered as characteristic for the invention are set forth in the appended claims.

Although the invention is illustrated and described herein as embodied in an electrical control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The electrical control device considered in greater detail here is a constituent part of an integrated circuit, for example of a controller for automotive and/or industrial applications. However, it will be appreciated that the invention is not restricted to the integrated configuration, in that the control device may also be a circuit constructed using discrete components.

In the exemplary embodiment described herein, the control device outputs periodic or nonperiodic control signals via its output terminals in order to drive any desired electrical devices. The control signals (output signals) are produced especially (but not necessarily exclusively) on the basis of external events, to be more precise on the basis of input signals which represent these events and are input via the input terminals of the control device.

Specific reference is had herein to a digital control device which is capable of detecting rising and/or falling edges in the signals received and the instants at which these edges occur, and, particularly as a function of this, capable of producing individual rising or falling edges in the control signals which are output and/or producing and outputting periodic control signals.

In addition or as an alternative, the control device may also be designed to react on the basis of the same or any other events or parameters as mentioned, or in a different way.

Figure 1:
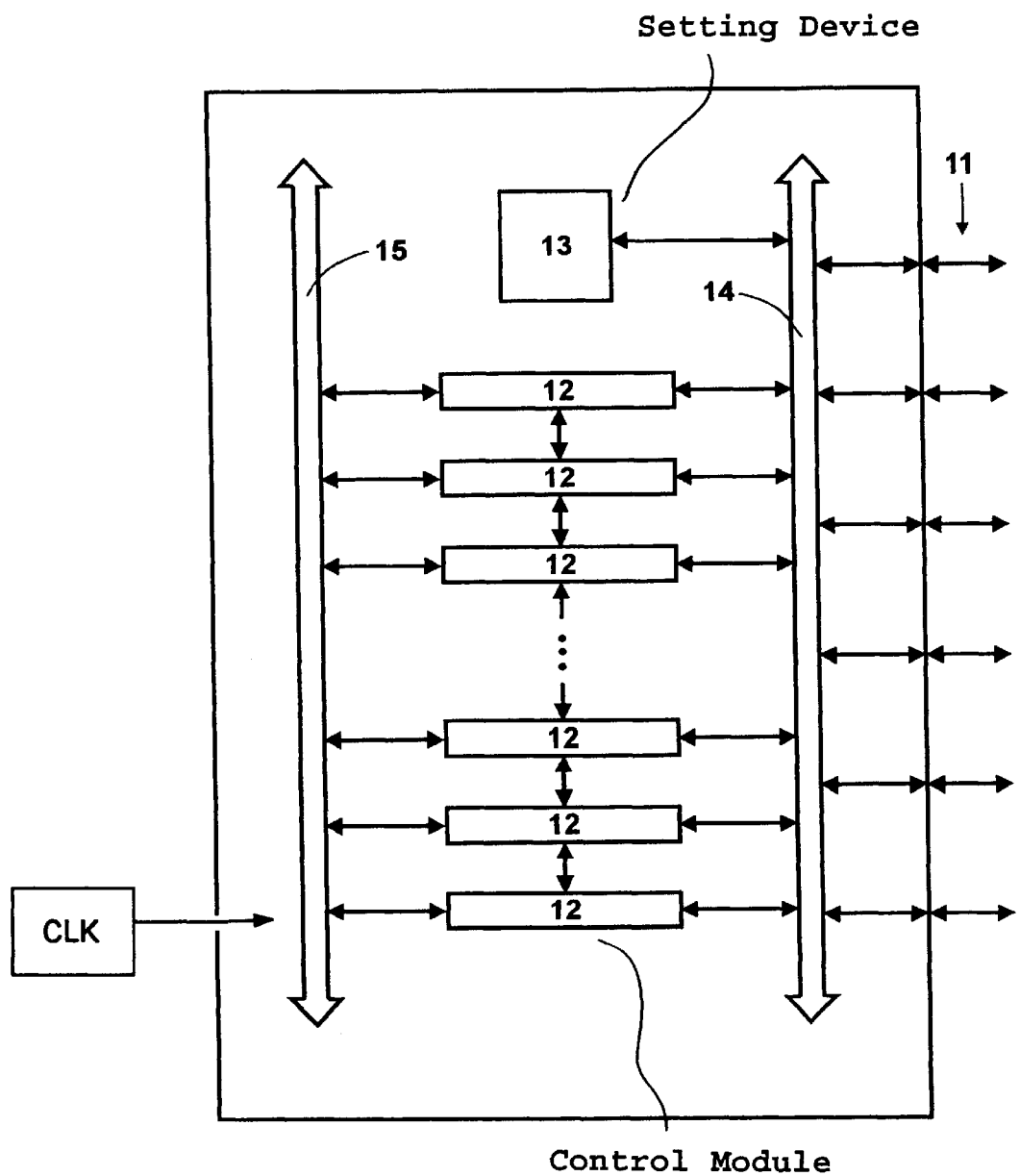
FIG. 1 is a schematic view of an exemplary embodiment of the control device according to the invention.

Referring now to the figures of the drawing in detail and first, particularly, to FIG. 1 thereof, there is seen a control device with a multiplicity of input and/or output terminals 11, a multiplicity of control modules 12 which are described in even greater detail below, a setting device 13 which is likewise described in even greater detail below and, if appropriate, further devices which are not shown in FIG. 1.

The function of the control modules 12 is to produce the control signals which are to be output from the control device and to feed them to the input and/or output terminals 11 of the control device. Each individual control module 12 is capable of doing this.

The control modules 12 are essentially identical control modules which are connected in series and are connected to the input and/or output terminals 11 and to the setting device 13 via a first bus 14 and are connected to a non-illustrated clock generator via a second bus 15. The control modules 12 and the input and/or output terminals 11 can be associated with one another in a fixed or a variable (adjustable or alterable) manner. There is no need for each control module 12 to be connected to an input and/or output terminal 11, and it is also possible, on the other hand, to provide for several of the input and/or output terminals 11 to be allocated to a control module 12.

The individual control modules can optionally be operated such that they interact individually or in groups. It is possible for the individual control module groups to comprise any number of control modules independently of one another.

The setting device 13 can be used to set whether and, if appropriate, which control modules operate interactively, and how, and which control modules are allocated to which input and/or output terminals.

Figure 2:
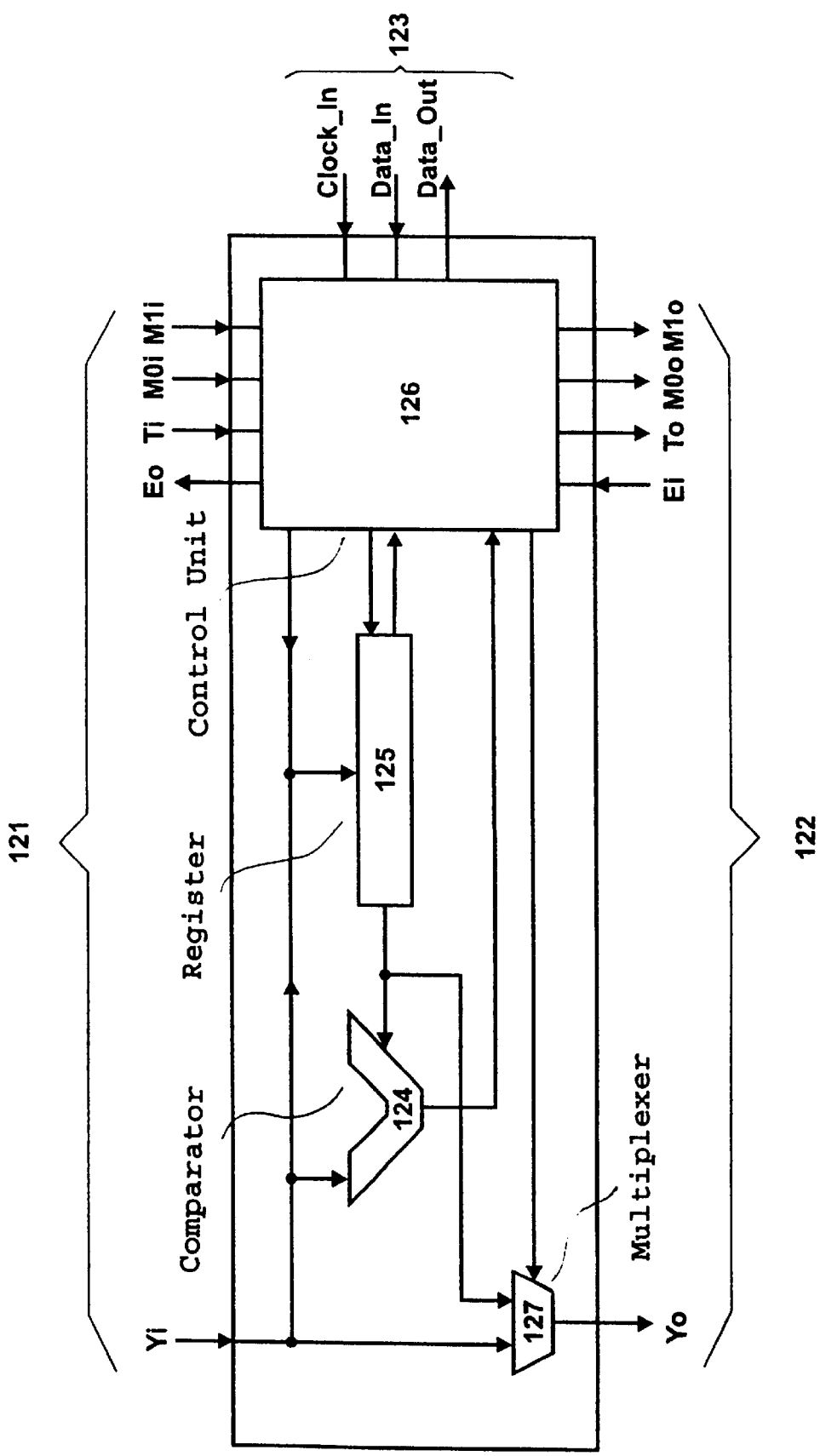
FIG. 2 is a diagrammatic view illustrating the structure of one of the control modules 12 contained in the control device shown in FIG. 1.

An exemplary structure of an individual control module 12 is shown in FIG. 2.

The control module 12 shown in FIG. 2 has first input and/or output terminals 121 (Yi, Eo, Ti, M0i, M1i), second input and/or output terminals 122 (Yo, Ei, To, M0o, M1o), and third input and/or output terminals 123 (Clock_In, Data_In, Data_Out). The first input and/or output terminals 121 connect to the control module which is disposed upstream of the relevant control module in the control module series circuit. The second input and/or output terminals 122 connect to the control module arranged downstream of the relevant control module in the control module series circuit. The third input and/or output terminals 123 connect to the input and/or output terminals 11, the setting device 13 and the clock generator through the buses 14 and 15.

In the example under consideration, the first input and/or output terminals 121 comprise an output terminal, designated by the reference symbol Eo, and four input terminals designated by the reference symbols Yi, Ti, M0i and M1i. In the exemplary embodiment, the second input and/or output terminals 122 comprise four output terminals, designated by the reference symbols Yo, To, M0o and M1o, and an input terminal designated by the reference symbol Ei. In the example under consideration, the third input and/or output terminals 123 comprise an output terminal, designated by the reference symbol Data_Out, and two input terminals designated by the reference symbols Data_In and Clock_In. Although it is not explicitly mentioned, some of the individual input and/or output terminals are input and/or output terminal groups comprising a number of input and/or output terminals. When control modules are connected in series, the connections Yi and Yo, Ei and Eo, Ti and To, M0i and M0o, and M1i and M1o are connected to one another.

The control modules 12 are designed to react to specific internal and/or external events in a predetermined manner and to output signals or data representing the reaction via the first input and/or output terminals 121 and/or the second input and/or output terminals 122 and/or the third input and/or output terminals 123.

In the example under consideration, the control modules are multifunctional modules which, on the basis of their being driven by the setting device 13, can be operated in different modes. For example, they may be optionally and selectively operated as counters, edge detectors, or comparators.

As can be seen from FIG. 2, the control modules 12 each contain a comparator 124, a register 125, a control unit 126 and a multiplexer 127, which are wired up as shown.

The way in which the respective control modules are operated, i.e. whether as a counter, as an edge detector or as a comparator, and, if appropriate, also the way in which the respective control modules react to specific events, is controlled by the setting device 13 instructing the respective control modules via the first bus 14 and one or more of the input terminals Data_In.

If the control module 12 is used as a counter, the count stored in the register 125 is incremented under the control of the control unit 126:
   on the basis of the timing of the clock signal fed to the
      control module from the clock generator via the second
      bus 15 and the input terminal Clock_In or
   with the rising edge, the falling edge or both edges of the
      signal which is input via the input and/or output
      terminal, allocated to the relevant control module, of
      the control device,
whereby it is possible to reset the counter in response to a signal which is fed, via the input terminal Ei, to the relevant control module from the control module arranged downstream of the latter in the control module sequence. The current counter reading can be output via the output terminal Yo; changes in the counter reading can be indicated via the output terminal To. If the counter reaches the count of zero, the relevant control module triggers internal processes and/or produces signals or data representing this event and outputs them via the first input and/or output terminals 121 and/or via the second input and/or output terminals 122 and/or via the third input and/or output terminals 123. If the control modules and/or the control device are program controlled, provision can be made, in addition or as an alternative, for an interrupt or other software event to be triggered.

If the control module 12 is used as an edge detector, the control unit detects the rising edge, the falling edge or both edges:
   of the signal which is fed to the control device via the
      input and/or output terminal, allocated to the relevant
      control module, of the control device, and/or
   of the clock signal fed to the control module from the
      clock generator via the second bus 15 and the input
      terminal Clock_In.

If an edge which is to be detected is detected in the signals, the relevant control module triggers internal processes and/or produces signals or data representing this event and outputs them via the first input and/or output terminals 121 and/or via the second input and/or output terminals 122 and/or via the third input and/or output terminals 123. The reaction to recognition of an edge can, in particular, be that the value obtained via the input terminal Yi is stored in the register 125. This is the so-called capture function. If the control modules and/or the control device are program controlled, provision may be made, in addition or as an alternative, for an interrupt or other software event to be triggered.

If the control module 12 is used as a comparator, two values, one of which is the count, fed via the input terminal Yi, of a counter arranged further upstream in the control module sequence (to be precise the count of a control module used as a counter), are checked for equality under the control of the control unit 126. If the values thus compared are equal, the relevant control module triggers internal processes and/or produces signals or data representing this event and outputs them via the first input and/or output terminals 121 and/or via the second input and/or output terminals 122 and/or via the third input and/or output terminals 123. If the control modules and/or the control device are program controlled, provision may be made, in addition or as an alternative, for an interrupt or other software event to be triggered. In the example under consideration, the comparison is only ever evaluated if the content of the register 125 changes or the relevant control module is informed via the input terminal Ti that the value received via the input terminal Yi has changed; in this way, each comparison result is reacted to only once, even if the equality condition continues to exist over a number of cycles of the operating clock of the control unit.

The exemplary control modules described herein individually function as follows:

If one of the events described above occurs, a rising or falling edge may be produced (except in the capture function) at the associated output terminal of the control device, or the state of the signal which is output via the associated output terminal of the control device may be inverted, or a corresponding command may be transmitted to the next control module via the output terminals M0o and/or M1o.

A control module receiving these or other commands via its input terminals M0i and/or M1i may either process them itself or forward them to the next control module via the output terminals M0o and/or M1o.

If a control module receives a command via its input terminals M0i and/or M1i and at the same time has to react to an event which it has detected itself, the reaction to be implemented in response to the event in question has priority over the execution and/or forwarding of the command received in the event of conflicts.

The individual control modules 12 themselves, their inter-action and their allocation to the individual input and/or output terminals 11 of the control device can, as already mentioned above, be individually configured (adjusted) independently of one another by means of the setting device 13. In the example under consideration, configuration takes place while the control device is operating by setting specific control registers.

The result of this is that any number of control modules reacting as desired to defined events can interact, as desired, with unilateral or reciprocal influence and be allocated to specific input and/or output terminals of the control device. Such flexible configurability means that the control device can be used for a wide variety of tasks, and in so doing can be in each case optimally adapted to the prevailing conditions with a minimum of effort.

Although it is currently regarded as optimal to construct the control device as described or in a similar manner, the device can be varied in many respects.

Thus, for example, it is not absolutely necessary for the control modules 12 to be essentially identical control modules; it is also possible for only some to be identical control modules, or even for them to be completely different control modules.

If the control modules 12 are multifunctional modules, as in the present case, their possible functions are not restricted to counting, comparison and edge detector functions; the control modules can be designed to undertake any other functions in addition or as an alternative.

However, the control modules do not have to be multifunctional modules whose function and mode of operation can be configured individually. Instead, it is at least to some extent also possible to use control modules with a permanent (unalterable) function. It is also possible to remove functions required for control, such as the counting function, from the control modules and instead provide common (global) devices for some or all of the control modules and make the output signals or data from these devices available to individual or all of the control modules.

There is also no need for the control modules to be wired up in series; provision may also be made for the control modules to be wired up in any other way. Nor do the connections between the control modules have to be permanent connections; provision may be made to make the connections between the control modules freely configurable to a greater or lesser extent, for example under the control of the setting device 13, the ideal situation being that each control module can be wired up in any desired manner to any other control modules.

It would also be conceivable to configure the control device permanently as desired, for example by blowing corresponding fuses or the like.

Regardless of the details of practical production of the control device, this device is of simple construction, can be used in a variety of ways, and in so doing can be in each case optimally adapted to the prevailing conditions with a minimum of effort.

We claim:

1. An electrical control device for producing control signals for driving electrical devices, comprising:
   a plurality of digital control modules configurable with respect to an inter-action thereof and capable of detecting rising or falling edges in the signal received and the instants at which the edges occur;
   said control modules producing control signals with individual rising or falling edges depending on the detected rising or falling edges in the signal received, for driving electrical devices.

2. The control device according to claim 1, wherein said control modules are adapted to react in a predetermined manner to specific events and to output data or signals representing the reaction to respective other control modules.

3. The control device according to claim 1, wherein said control modules are adapted to react in a predetermined manner to specific events and to output data or signals representing the reaction as output signals of said control device.

4. The control device according to claim 1, which further comprises a setting device connected to said control modules, said setting device selectively setting an interaction between respective said control modules.

5. The control device according to claim 4, wherein said setting device is adapted to implement the settings individually while the control device is in operation.

6. The control device according to claim 1, which further comprises a plurality of input terminals and output terminals, and a setting device for selectively setting which of said control modules are connected to which input terminals and output terminals of the control device.

7. The control device according to claim 6, wherein said setting device is adapted to implement the settings individually while the control device is in operation.

8. The control device according to claim 1, wherein said control modules are connected in series to form a control module sequence.

9. The control device according to claim 8, wherein said control modules feed data or signals to a respective said control module which is connected adjacent in said control module sequence.

10. The control device according to claim 1, wherein said control modules are adapted to pass on data or signals received from one of said control module to another said control module.

11. The control device according to claim 1, wherein said control modules are of substantially identical construction.

12. The control device according to claim 1, wherein said control modules are multifunctional modules which can operate independently of one another in one of a plurality of operating modes as selected.

13. The control device according to claim 12, wherein said control modules are adapted to be used as a counter.

14. The control device according to claim 12, wherein said control modules are adapted to be used as a comparator.

15. The control device according to claim 12, wherein said control modules are adapted to be used as an edge detector.

16. The control device according to claim 15, wherein said control modules are adapted to be used as a capture unit.

* * * * *

UNITED STATES PATENT AND TRADEMARK OFFICE
CERTIFICATE OF CORRECTION

PATENT NO. : 6,289,400 B1
DATED : September 11, 2001
INVENTOR(S) : Peter Rohm et al.

It is certified that error appears in the above-identified patent and that said Letters Patent is hereby corrected as shown below:

<u>Column 6,</u>
Line 38, should read as follows:
-- 1. An electrical control device for producing control signals for driving electrical devices, comprising:

a plurality of digital control modules configurable with respect to an inter-action thereof and capable of detecting rising or falling edges in the signal received;

said control modules producing control signals with individual rising or falling edges depending on the detected rising or falling edges in the signal received, for driving electrical devices. --

Signed and Sealed this

Twenty-seventh Day of August, 2002

Attest:

*Attesting Officer*

JAMES E. ROGAN
*Director of the United States Patent and Trademark Office*